United States Patent
Saito

(10) Patent No.: US 8,103,079 B2
(45) Date of Patent: Jan. 24, 2012

(54) CHEST IMAGE ROTATION APPARATUS, METHOD AND RECORDING-MEDIUM STORED THEREIN PROGRAM

(75) Inventor: Takaaki Saito, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 514 days.

(21) Appl. No.: 12/395,114

(22) Filed: Feb. 27, 2009

(65) Prior Publication Data

US 2009/0220174 A1 Sep. 3, 2009

(30) Foreign Application Priority Data

Feb. 29, 2008 (JP) .................................. 2008-049230

(51) Int. Cl.
*G06K 9/00* (2006.01)
(52) U.S. Cl. ........................................ 382/132; 382/291
(58) Field of Classification Search .................. 382/128, 382/132, 291, 294, 308; 128/922; 356/39; 377/10; 600/407
See application file for complete search history.

(56) References Cited

U.S. PATENT DOCUMENTS

| | | | |
|---|---|---|---|
| 6,594,378 B1 * | 7/2003 | Li et al. | 382/128 |
| 7,043,066 B1 * | 5/2006 | Doi et al. | 382/132 |
| 7,324,660 B2 * | 1/2008 | Oosawa | 382/100 |
| 7,352,888 B2 * | 4/2008 | Luo et al. | 382/132 |
| 7,889,904 B2 * | 2/2011 | Sato | 382/130 |

FOREIGN PATENT DOCUMENTS

| | | |
|---|---|---|
| JP | 2001-222704 A | 8/2001 |
| JP | 2002-360551 A | 12/2002 |
| JP | 2007-068715 A | 3/2007 |

\* cited by examiner

*Primary Examiner* — Seung C Sohn
(74) *Attorney, Agent, or Firm* — Sughrue Mion, PLLC

(57) ABSTRACT

A chest image rotation apparatus includes a chest image input unit that is used to input a chest image, a vertebral-body region extraction unit that extracts a vertebral-body region from the input chest image, a vertebral-body direction calculation unit that calculates, based on the extracted vertebral-body region, the direction of vertebral bodies in the chest image, a chest image rotation unit that rotates the chest image so that the calculated direction of the vertebral bodies becomes perpendicular to the horizontal side of the chest image, and an output unit that outputs the rotated chest image.

9 Claims, 7 Drawing Sheets

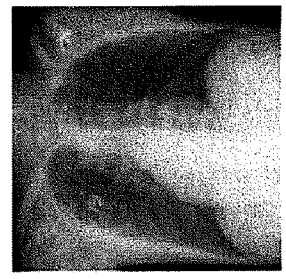
FIG.3D ROTATE CHEST IMAGE
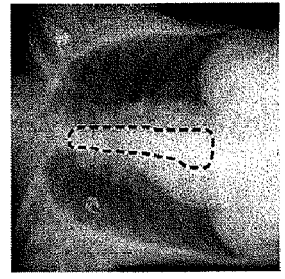
FIG.3C CALCULATE DIRECTION OF VERTEBRAL BODY
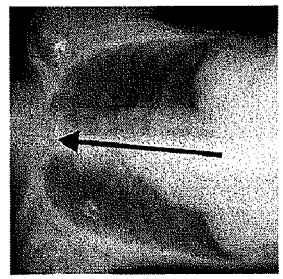
FIG.3B EXTRACT VERTEBRAL-BODY REGION
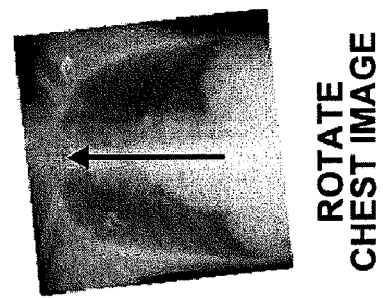
FIG.3A CHEST IMAGE

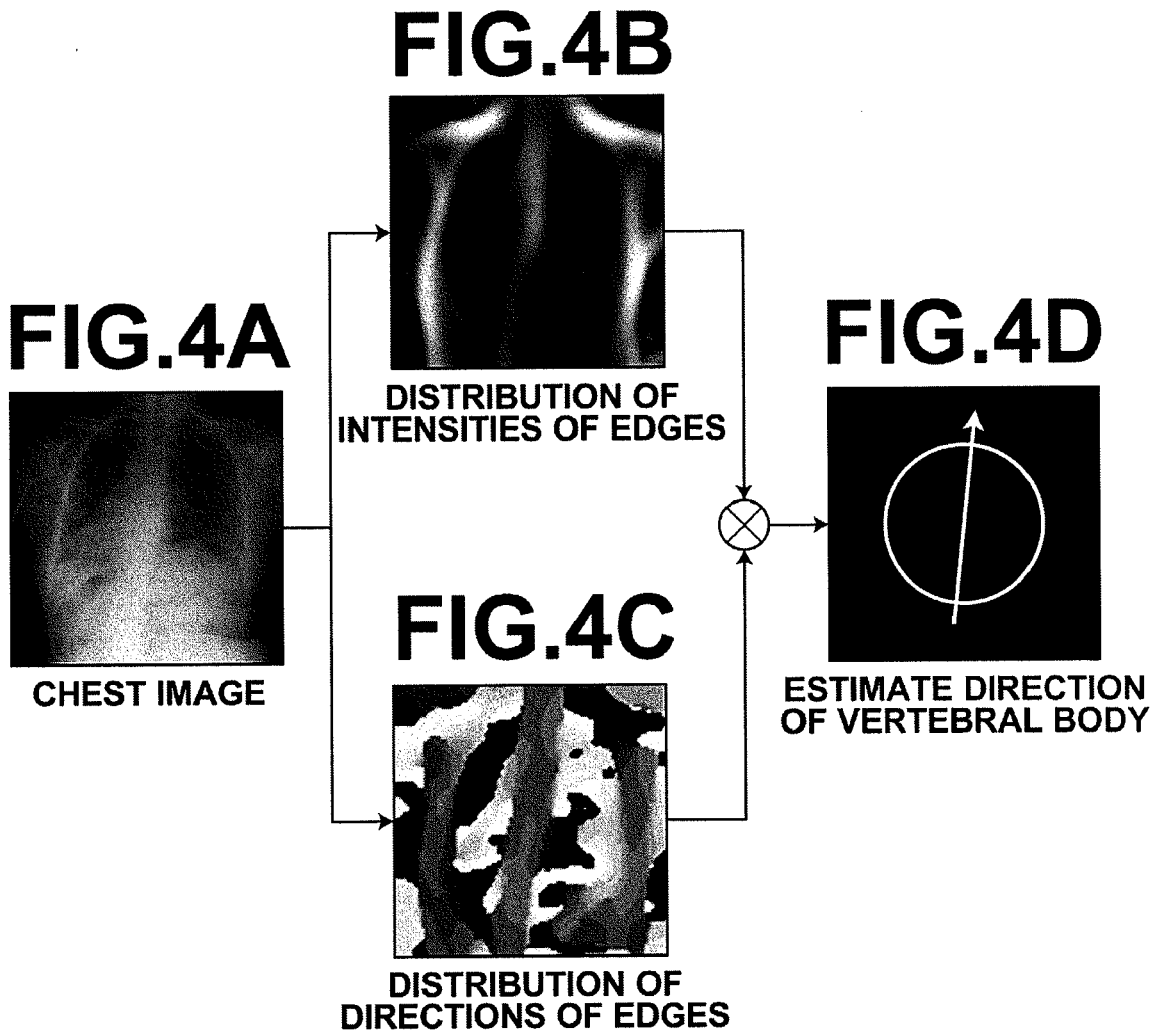
FIG.4B DISTRIBUTION OF INTENSITIES OF EDGES
FIG.4A CHEST IMAGE
FIG.4C DISTRIBUTION OF DIRECTIONS OF EDGES
FIG.4D ESTIMATE DIRECTION OF VERTEBRAL BODY
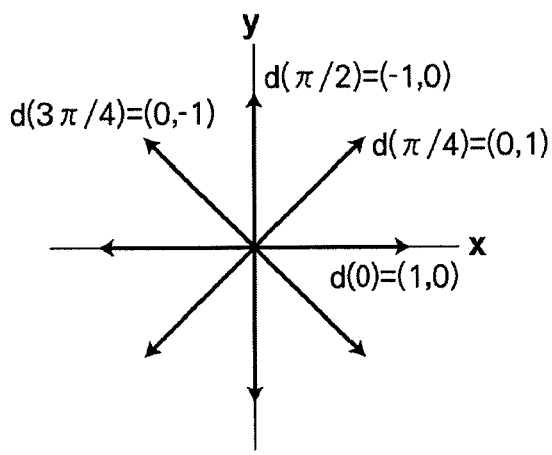
FIG.5A
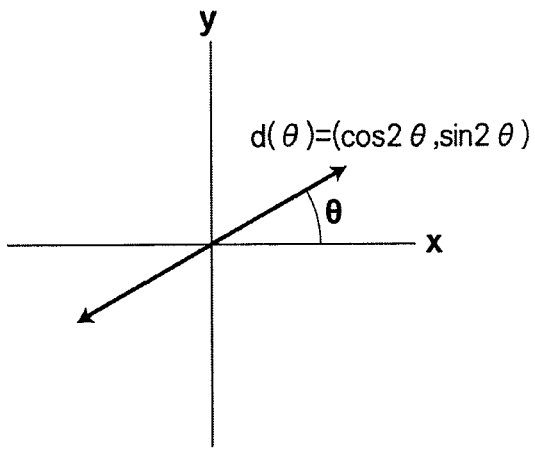
FIG.5B

EXTRACT VERTEBRAL-BODY REGION

DETECT MEDIAN LINE

CHEST IMAGE 1

CHEST IMAGE 2

ROTATE CHEST IMAGE 2
BASED ON CHEST IMAGE 1

CHEST IMAGE 3

ROTATE CHEST IMAGE 3
BASED ON CHEST IMAGE 1

CHEST IMAGE ROTATION APPARATUS, METHOD AND RECORDING-MEDIUM STORED THEREIN PROGRAM

BACKGROUND OF THE INVENTION

1. Field of the Invention

The present invention relates to processing for rotating a chest image, and particularly to a chest image rotation apparatus and method that is suitable for rotating the chest image by using the direction of the vertebral bodies (corpus vertebrae) in the chest image. Further, the present invention relates to a computer-readable recording-medium stored therein a program for the apparatus and method.

2. Description of the Related Art

Conventionally, in the fields of medicine, a technique for automatically rotating a chest image that has been obtained by imaging the chest of a subject (patient) from the front side thereof is essential to observation of the subject by a user (doctor or the like) when the subject was imaged in inappropriate posture (position).

Meanwhile, a technique for displaying an image of a pair of breasts on a monitor in such a manner that the breasts, which have been imaged in the same direction, face each other has been proposed in Japanese Unexamined Patent Publication No. 2001-222704. In this technique, the breast image obtained by imaging is rotated based on information about the position of the subject.

Further, a method for extracting a feature value from a predetermined partial region of a chest image obtained by imaging a subject from the front side thereof has been proposed in Japanese Unexamined Patent Publication No. 2002-360551. In this method, a rotation angle is detected based on the predetermined partial region of the chest image and the direction of an end of a sensor, and the chest image is rotated based on the detection result. Further, the feature value is extracted from the partial region after rotation.

However, in actual medical scenes, a need for imaging a patient who cannot move from his/her bed in the patient's room of a hospital, a need for emergency imaging in an operating room of a hospital and the like are increasing in recent years. Therefore, a mobile X-ray apparatus (hereinafter, referred to as "mobile cart (mobile unit) M for doctor's visits to patients' rooms" (mobile cart M)) as illustrated in FIG. 9 will be used in actual medical scenes in the near future. The mobile cart M can be moved to the patient's room or the like to image the chest or the like of the patient. For example, when the mobile cart M is used to image the patient, a cassette 70 is placed on the back side of the subject (patient) who is lying on a bed 80, as illustrated in FIG. 10. Therefore, if the cassette 70 is set in an inappropriate manner, or if the posture of the patient is not appropriate, the patient, the axis of which is significantly inclined with respect to the sides of the cassette 70, is imaged in some cases.

In such cases, the method disclosed in Japanese Unexamined Patent Publication No. 2001-222704 is insufficient to solve the problem. In the method disclosed in Japanese Unexamined Patent Publication No. 2001-222704, it is impossible to rotate an image based on the degree of inclination of an anatomically characteristic region (for example, a lung field, a vertebral body, a breast or the like) in the image. Further, it is impossible to rotate the image without using the information about the position of the subject.

Further, in the method disclosed in Japanese Unexamined Patent Publication No. 2002-360551, when the subject, the axis of which is significantly inclined, has been imaged, if a feature value is extracted from a predetermined partial region of the image, the shape of the predetermined partial region differs according to the inclination angle. Therefore, it is impossible to extract an accurate feature value. Hence, it is impossible to accurate extract the predetermined partial region. Further, there is a problem that information about the inclination of an edge of a sensor is necessary to rotate the image, and that it is impossible to rotate the image by using only the information about the image.

SUMMARY OF THE INVENTION

In view of the foregoing circumstances, it is an object of the present invention to provide a chest image rotation apparatus and method that can improve the performance for rotating a chest image. Further, it is another object of the present invention to provide a program for the apparatus and method and a computer-readable recording medium stored therein the program.

A chest image rotation apparatus according to the present invention is a chest image rotation apparatus comprising:

a chest image input unit that is used to input a chest image;

a vertebral-body region extraction unit that extracts a vertebral-body region from the input chest image;

a vertebral-body direction calculation unit that calculates, based on the extracted vertebral-body region, the direction of vertebral bodies in the chest image;

a chest image rotation unit that rotates the chest image so that the calculated direction of the vertebral bodies becomes perpendicular to the horizontal side of the chest image; and an output unit that outputs the rotated chest image.

The phrase "the horizontal side of the chest image" refers to a side of the input chest image, the side extending in the horizontal direction of the chest image. For example, the horizontal side of the chest image may be a side that is substantially perpendicular to the direction in which the vertebral bodies extend in the chest image.

Further, the "output unit" outputs the input chest image, the rotated chest image or the like. For example, the output unit may be a monitor (display) or the like for displaying the chest images, a printer for printing the chest images or the like. Alternatively, the output unit may trim the rotated chest image so that at least lung fields remain in the chest image after trimming, and output the trimmed chest image. Trimming may be performed in such a manner that the horizontal side of the chest image after trimming and the horizontal side of the chest image before rotation are parallel to each other.

Further, the "vertebral-body region extraction unit" extracts a vertebral-body region from the input chest image. The vertebral-body region extraction unit may include an edge component extraction unit, a vertebral-body direction estimation unit and a vertebral-body region determination unit. The edge component extraction unit extracts an edge component value that includes an edge direction value and an edge intensity value from the chest image, the edge component value corresponding to the width (thickness) of the vertebral bodies, from the chest image. The vertebral-body direction estimation unit estimates the direction of the vertebral bodies based on the magnitude of the extracted edge component value. The vertebral-body region determination unit scans the chest image substantially perpendicular to the estimated direction of the vertebral bodies to obtain the values of pixels in the chest image. Further, the vertebral-body region determination unit extracts the vertebral-body region by comparing the obtained values of the pixels with a predetermined threshold value by setting the predetermined threshold value.

Further, the "vertebral-body direction calculation unit" may detect a median line in the vertebral-body region extracted by the vertebral-body region extraction unit, and calculate the direction of the vertebral bodies based on the median line.

Further, a chest image rotation apparatus according to the present invention may be a chest image rotation apparatus comprising:

a chest image input unit that is used to input a plurality of chest images;

a vertebral-body region extraction unit that extracts a vertebral-body region from each of the plurality of chest images;

a vertebral-body direction calculation unit that calculates, based on the extracted vertebral-body region, the direction of vertebral bodies in each of the plurality of chest images;

a chest image rotation unit that rotates at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image; and an output unit that outputs the predetermined chest image and the at least one of the plurality of chest images that is not the predetermined chest image and that has been rotated.

The term "predetermined chest image" refers to one of the plurality of chest images input by the chest image input unit, the one of the plurality of chest images being used as a base image for processing.

The phrase "at least one of the plurality of chest images that is not a predetermined chest image" refers to a chest image or chest images that are included in the plurality of chest images input by the chest image input unit, but that are not the predetermined chest image.

Further, a chest image rotation method according to the present invention is a chest image rotation method comprising the steps of:

receiving a chest image;

extracting a vertebral-body region from the received chest image;

calculating, based on the extracted vertebral-body region, the direction of vertebral bodies in the chest image;

rotating the chest image so that the calculated direction of the vertebral bodies becomes perpendicular to the horizontal side of the chest image; and outputting the rotated chest image.

Further, a chest image rotation method according to the present invention is a chest image rotation method comprising the steps of:

receiving a plurality of chest images;

extracting a vertebral-body region from each of the plurality of chest images;

calculating, based on the extracted vertebral-body region, the direction of vertebral bodies in each of the plurality of chest images;

rotating at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image; and outputting the predetermined chest image and the at least one of the plurality of chest images that is not the predetermined chest image and that has been rotated.

Further, a computer-readable recording medium stored therein a program for rotating a chest image according to the present invention may be a computer-readable recording medium stored therein a program for causing a computer to execute the procedures of:

receiving a chest image;

extracting a vertebral-body region from the received chest image;

calculating, based on the extracted vertebral-body region, the direction of vertebral bodies in the chest image;

rotating the chest image so that the calculated direction of the vertebral bodies becomes perpendicular to the horizontal side of the chest image; and outputting the rotated chest image.

Further, a computer-readable recording medium stored therein a program for rotating a chest image according to the present invention may be a computer-readable recording medium stored therein a program for causing a computer to execute the procedures of:

receiving a plurality of chest images;

extracting a vertebral-body region from each of the plurality of chest images;

calculating, based on the extracted vertebral-body region, the direction of vertebral bodies in each of the plurality of chest images;

rotating at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image; and outputting the predetermined chest image and the at least one of the plurality of chest images that is not the predetermined chest image and that has been rotated.

According to a chest image rotation apparatus and method of the present invention and a computer-readable recording medium stored therein a program for the apparatus and method of the present invention, a vertebral-body region is extracted from an input chest image, and the direction of vertebral bodies in the chest image is calculated based on the extracted vertebral-body region. Further, the chest image is rotated so that the calculated direction of the vertebral bodies becomes perpendicular to the horizontal side of the chest image. Accordingly, the chest image can be rotated based on the direction of the axis of the subject. Further, it is possible to calculate an appropriate rotation angle by using only the chest image.

Further, according to a chest image rotation apparatus and method of the present invention and a computer-readable recording medium stored therein a program for the apparatus and method of the present invention, a vertebral-body region is extracted from each of the plurality of chest images, and the direction of vertebral bodies in each of the plurality of chest images is calculated based on the extracted vertebral-body region. Further, at least one of the plurality of chest images that is not a predetermined chest image thereof is rotated so that the calculated direction of the vertebral bodies in the at least one of the plurality of chest images that is not the predetermined chest image becomes the same as the calculated direction of the vertebral bodies in the predetermined chest image. Accordingly, when the chest images are used to observe the progress or course of the disease of the patient, even if the direction of the patient in the chest images differs from each other, it is possible to output the chest images in such a manner that the inclination angle of the patient in the chest images is the same as a predetermined inclination angle of the patient. Further, it is possible to calculate an appropriate rotation angle by using only the chest image or images.

Meanwhile, those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted.

BRIEF DESCRIPTION OF THE DRAWINGS

FIG. 3A is a conceptual diagram illustrating a process in an embodiment of the present invention;

FIG. 3B is a conceptual diagram illustrating a process in the embodiment of the present invention;

FIG. 3C is a conceptual diagram illustrating a process in the embodiment of the present invention;

FIG. 3D is a conceptual diagram illustrating a process in the embodiment of the present invention;

FIG. 4A is a diagram illustrating a chest image;

FIG. 4B is a diagram illustrating distribution of the intensities of edges;

FIG. 4C is a diagram illustrating distribution of the directions of edges;

FIG. 4D is a diagram illustrating estimation of the direction of vertebral bodies;

FIG. 5A is a conceptual diagram for explaining an edge direction value corresponding to an edge intensity value;

FIG. 5B is a conceptual diagram for explaining the edge direction value corresponding to the edge intensity value;

DESCRIPTION OF THE PREFERRED EMBODIMENTS

Hereinafter, an embodiment of a chest image rotation apparatus according to the present invention will be described with reference to drawings.

Figure 1:
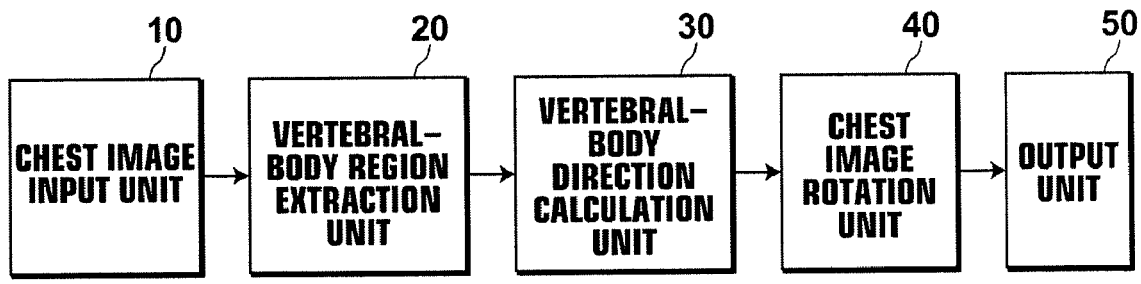
FIG. 1 is a functional block diagram illustrating a chest image rotation apparatus.

FIG. 1 is a block diagram illustrating an embodiment of the chest image rotation apparatus according to the present invention.

The configuration of the chest image rotation apparatus as illustrated in FIG. 1 may be realized by causing a computer (for example, a personal computer or the like) to execute a chest image rotation program installed in an auxiliary recording apparatus (supplementary storage apparatus) (not illustrated). Further, the chest image rotation program may be stored in an information recording medium, such as a CD-ROM (compact disk read-only memory) and an internal memory, or distributed through a network, such as the Internet, to be installed in a computer.

A chest image rotation apparatus of the present invention calculates, based on a chest image of a subject (patient) that has been obtained by imaging the chest of the subject, a vertebral-body region in the chest image, for example. Further, the chest image rotation apparatus of the present invention rotates the chest image, considering the axis (body axis) of the subject. The chest image rotation apparatus includes a chest image input unit 10, a vertebral-body region extraction unit 20, a vertebral-body direction calculation unit 30, a chest image rotation unit 40, an output unit 50 and the like.

The chest image input unit 10 receives a chest image that has been obtained as a radiographic image (radiograph), for example. It is not necessary that the chest image is the radiographic image. The chest image input unit 10 may be used to input (receive) medical images, such as CT images, MRI images, RI images, PET image, and X-ray images.

Further, in the present embodiment, a case in which the chest image rotation apparatus of the present invention is used to rotate the chest image will be described. However, it is not necessary that the image is the chest image. The chest image rotation apparatus of the present invention may be used to observe other anatomical features (a region including the vertebral body or bodies, a limb bone or bones, or the like).

Further, the vertebral-body extraction unit 20 extracts a vertebral-body region from the chest image that has been input by the chest image input unit 10.

The vertebral-body direction calculation unit 30 calculates the direction of the vertebral bodies in the chest image based on the vertebral-body region that has been extracted by the vertebral-body region extraction unit 20.

The chest image rotation unit 40 rotates the chest image so that the direction of the vertebral bodies calculated by the vertebral-body direction calculation unit 30 becomes perpendicular to the horizontal direction of the chest image.

The output unit 50 outputs the chest image that has been rotated by the chest image rotation unit 40. For example, the output unit 50 is a liquid crystal display monitor or the like, which displays the chest image. The output unit 50 may be a monitor 66 of mobile cart M, which will be described later. Alternatively, the output unit 50 may be a printer or the like.

Next, processing in the embodiment of the chest image rotation apparatus, which is configured as described above, will be described.

Figure 2:
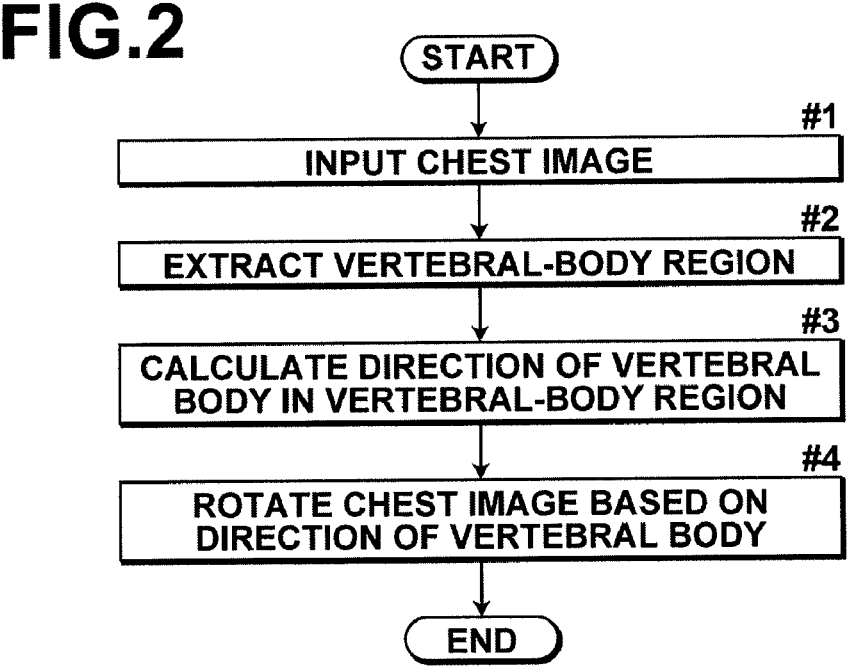
FIG. 2 is a flow chart showing a series of processes in an embodiment of the present invention.

FIG. 2 is a flow chart showing a series of processes performed by the chest image rotation apparatus.

As illustrated in FIG. 2, first, the chest image input unit 10 inputs a chest image, which has been obtained by imaging the chest of a subject (patient) (step #1). The chest image is, for example, an image illustrated in FIG. 3A. Next, the vertebral-body region extraction unit 20 extracts a vertebral-body region from the chest image (step #2). The vertebral-body region is, for example, a region illustrated in FIG. 3B.

The vertebral-body region extraction unit 20 may include an edge component extraction unit (not illustrated), a vertebral-body direction estimation unit (not illustrated), and a vertebral-body region determination unit (not illustrated). The edge component extraction unit extracts an edge component value that includes an edge direction value and an edge intensity value, the edge component value corresponding to the width of the vertebral bodies, from the chest image. The vertebral-body direction estimation unit estimates the direction of the vertebral bodies based on the magnitude of the edge component value that has been extracted by the edge component extraction unit. The vertebral-body region determination unit scans the chest image substantially perpendicular to the direction of the vertebral bodies that has been estimated by the vertebral-body direction estimation unit to obtain the values of pixels in the chest image. Further, the vertebral-body region determination unit extracts the vertebral-body region by comparing the obtained values of the pixels with a predetermined threshold value.

The edge component extraction unit extracts the edge component value, which includes the edge direction value and the edge intensity value, and which corresponds to the width of the vertebral bodies, from the chest image. Further, the edge component extraction unit uses a predetermined filter and extracts, as the edge component values, a plurality of edge direction values and a plurality of edge intensity values with respect to a plurality of directions. Further, the edge component extraction unit obtains a highest edge intensity value of the plurality of edge component values that have been extracted and an edge direction value that corresponds to the highest edge intensity value. Specifically, processing is performed on the chest image that has been input by the chest image input unit 10. The edge component extraction unit extracts an edge component value that includes an edge direction value and an edge intensity value, the edge component value corresponding to the width of the vertebral bodies, from the chest image by using a Gabor filter, which is represented by the following equation (1):

$$\text{Gabor}(x,y,\theta)=\exp[-(1/2\sigma 2)(x^2+y^2)]\cos[(\pi/\sigma)(x\sin\theta+y\cos\theta)] \quad (1).$$

Here, σ is a parameter corresponding to the width of an edge to be extracted, and the value of σ is adjusted so as to correspond to the width of the vertebral bodies in the chest image. Further, θ corresponds to the direction of an edge to be extracted, and Gabor (x, y, θ) extracts an edge at angle θ (direction θ) counterclockwise from the horizontal direction.

A plurality of Gabor filters are prepared to extract, as the edge component values, a plurality of edge direction values and a plurality of edge intensity values with respect to a plurality of directions. For example, a plurality of Gabor filters, the angles θ of which differ from each other by 15 degrees within the range of 0 degree to 165 degrees, are prepared.

Filtering is performed on the chest image that has been input by the chest image input unit 10 by using each of the plurality of Gabor filters that have been prepared. Filtering processing is performed on the chest image pixel by pixel, and a filter value for each pixel is obtained. As the filter value, the absolute value of the intensity is obtained.

Filter values corresponding to the plurality of filters are obtained for a single pixel. Therefore, a component that has the highest absolute value of the intensity (highest edge intensity value) and an edge direction value that corresponds to the highest edge intensity are obtained from the obtained filter values. Then, with respect to each of all the pixels, a highest edge intensity value and an edge direction value that corresponds to the highest edge intensity value are obtained.

Accordingly, the edge component extraction unit obtains, with respect to each pixel of the chest image, a highest edge intensity value. Further, the edge component extraction unit obtains an edge direction value that corresponds to the highest edge intensity value. The edge component extraction unit produces an edge intensity distribution image and an edge direction distribution image based on the highest edge intensity values and the edge direction values that correspond to the highest edge intensity values, respectively.

In the above description, the highest edge intensity value is the highest absolute value of the intensity that has been obtained as the filter value. Alternatively, the highest edge intensity value may be a value selected from the absolute values of intensities that are greater than or equal to a predetermined value. Similarly, the edge direction value that corresponds to the highest edge intensity value may be a value corresponding to a value selected from the absolute values of intensities that are greater than or equal to a predetermined value.

FIG. 4B illustrates a distribution image related to the intensities of edges that has been produced based on the highest edge intensity value of the chest image by using the above equation. In FIG. 4B, the distribution image is represented by grayscale (degree of density). FIG. 4C illustrates a distribution image related to the directions of edges that has been produced based on an edge direction value that corresponds to the highest edge intensity value of the chest image by using the above equation. In FIG. 4C, the distribution image is represented by grayscale (degree of density).

Next, the vertebral-body direction estimation unit estimates the direction of vertebral bodies based on the magnitude of the edge component value extracted by the edge component extraction unit. Specifically, the vertebral-body direction estimation unit sets a region of interest in circular form that has an appropriate size at the center of the image, as illustrated in FIG. 4D. The region of interest is set by a region-of-interest setting means (not illustrated).

Here, as illustrated in FIGS. 5A and 5B, a bidirectional vector directed at angle θ (gradient θ) with respect to X axis of the chest image is defined as the following equation (2):

$$d(\theta)=(\cos 2\theta, \sin 2\theta) \quad (2).$$

The vector defined by the equation (2) may be represented by the following equation (3):

$$d(\theta)=d(\theta+\pi) \quad (3).$$

Among pixels i (i=1, . . . , n) in the region of interest, which has been set as described above, the absolute value of the highest edge intensity value is represented by $|G(\theta i)|$. Further, an edge direction value that corresponds to the highest edge intensity value is represented by θi. When the values of d(θi) in the region of interest are weighted by $|G(\theta i)|$ and averaged, average direction vector d_mean(x, y) is obtained, as represented by the following equation (4):

$$d\_\text{mean}=\{\Sigma(i=1\ldots n)|G(\theta i)|d(\theta i)\}/\Sigma(i=1\ldots n)|G(\theta i)| \quad (4).$$

Here, the pixels i (i=1, . . . , n) in the region of interest may be pixels in the entire area of the chest image.

As described above, the vertebral-body direction unit can estimate the direction of the vertebral bodies based on the obtained d_mean(x, y).

The vertebral-body direction estimation unit converts the obtained d_mean (x, y) into an angle with respect to X axis by using the following equations (5) and (6):

$$\text{When } y>0, \theta\_\text{mean}=(1/2)\arccos x \quad (5), \text{ and}$$

$$\text{when } y<0, \theta\_\text{mean}=\pi-(1/2)\arccos x \quad (6).$$

The vertebral-body direction estimation unit does not weight the edge direction value θi that corresponds to the highest edge intensity value by the absolute value $|G(\theta i)|$ of the highest edge intensity value to obtain an average value (weighted average value). Therefore, it is possible to prevent the value from becoming π/2, which is an average of θ=0 and θ=π (essentially, these two angles represent the same direction).

The vertebral-body direction estimation unit can exclude components outside the region of interest by setting the region of interest. The components outside the region of interest are side edge regions on both sides of the chest, in which the ribs (costae) overlap with each other, collar bones (clavicles), and the like. Since the region of interest is set, the vertebral-body direction estimation unit can accurately estimate the vertebral-body region.

Next, the vertebral-body region determination unit scans the chest image in a direction that is substantially perpendicular to the direction of the vertebral bodies estimated by the vertebral-body direction estimation unit to obtain pixel values. Further, the vertebral-body region determination unit compares the obtained pixel values with a predetermined threshold value to extract pixels of the vertebral-body region. For example, the vertebral-body region determination unit extracts, as the vertebral-body region, each pixel of the chest image, the pixel value of which is lower than or equal to a predetermined threshold value.

Further, a median line is detected by using the direction of the vertebral bodies estimated by the vertebral-body direction estimation unit. When the image is a chest image, the median line is located on the vertebral bodies, and the density of the vertebral-body region is lower than the densities of other regions, such as lung fields and a diaphragm, in the vicinity of the vertebral-body region. Therefore, such a difference in the densities may be used to detect the vertebral-body region. Specifically, an appropriate threshold value that corresponds to a middle value between the density of the lung fields and that of the vertebral bodies may be set, and the vertebral-body region may be extracted by performing binarization (binary processing) using the threshold value.

Figure 6A:
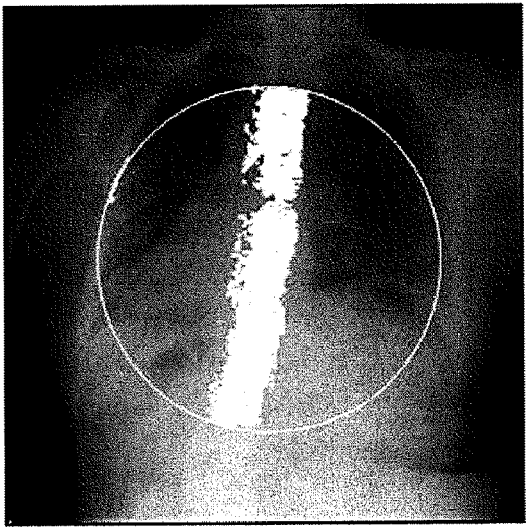
FIG. 6A is a diagram illustrating a vertebral-body region.

For example, the vertebral-body region extraction unit 20 scans the chest image within the region of interest that has been set by a region-of-interest setting means 35. The vertebral-body region extraction unit 20 scans the chest image in a direction that is substantially perpendicular to the direction of the vertebral bodies. Further, the vertebral-body region extraction unit 20 selects an appropriate number of pixels that have low densities (pixel values) in each row of pixels that have been scanned. The appropriate number of pixels are selected in such a manner that the pixel that has the lowest density value and a pixel that has a density value closer to the lowest density value are sequentially selected from the pixels of each row until the number of the selected pixels reaches the appropriate number. Accordingly, a region that covers (includes) the vertebral bodies can be obtained, as illustrated in FIG. 6A.

The vertebral-body direction calculation unit 30 calculates the direction of the vertebral bodies in the chest image based on the vertebral-body region extracted by the vertebral-body region extraction unit 20 (step #3). For example, the vertebral-body direction calculation unit 30 includes a median-line detection unit (not illustrated). The vertebral-body direction calculation unit 30 may detect a center line of the bilateral lungs (hereinafter, referred to as a median line) that appears in the chest image in the vertebral-body region that has been detected by the vertebral-body region extraction unit 20. Further, the vertebral-body direction calculation unit 30 may calculate the direction of the vertebral bodies based on the median line. Here, it is not necessary that the median line is an exact center line of the bilateral lungs (lungs). For example, the median line may be a line formed by a center axis of the vertebral-body region, which is located at the center of the lungs.

After then, the median line detection unit detects a median line from the vertebral-body region that has been extracted by the vertebral-body region extraction unit 20.

Figure 6B:
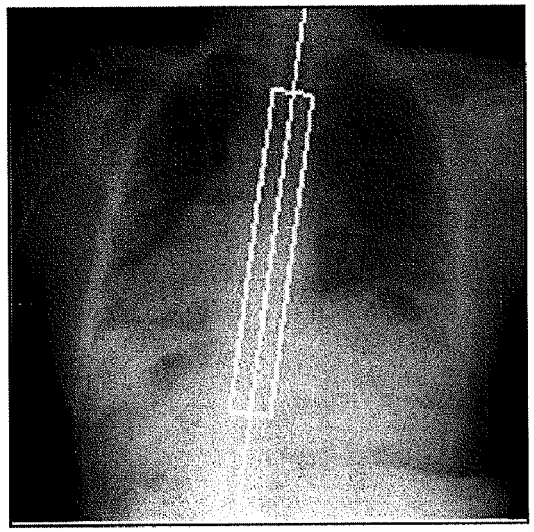
FIG. 6B is a diagram illustrating a median line.

The median line detection unit uses data on the width of the vertebral bodies, which is stored in an auxiliary storage apparatus, and performs processing on the vertebral-body region extracted by the vertebral-body region extraction unit 20. The median line detection unit fits a rectangle that has an appropriate length (size) corresponding to the width of the vertebral bodies to the vertebral-body region. The median line detection unit adjusts the position and the direction of the rectangle so that the number of pixels of the vertebral-body region within the rectangle becomes the maximum number, and extracts a center axis of the rectangle. Accordingly, the median line as illustrated in FIG. 6B can be detected.

Here, as the method for extracting each pixel that has a pixel value less than or equal to a predetermined value, a threshold value that is lower than or equal to a predetermined value may be set for each pixel to extract the vertebral-body region. Alternatively, the same threshold value that is less than or equal to a predetermined pixel value may be set for all the pixels to extract the vertebral-body region.

Alternatively, in the present invention, the median line detection unit may adopt a method disclosed in Japanese Unexamined Patent Publication No. 2007-068715, for example. Specifically, profiles along a direction substantially perpendicular to the direction of the vertebral bodies, estimated by the vertebral-body direction estimation unit, may be generated in a plurality of regions, and the profiles may be analyzed to detect the median line.

The vertebral-body direction calculation unit 30 can judge the vertical direction (up-down direction) of the chest image by analyzing the chest image, for example. For example, the vertebral-body direction calculation unit 30 may use a characteristic of chest images that the pixels of the chest images have a gradient in pixel values, in which the head side of the chest image has high pixel values and the abdominal side of the chest image has low pixel values (when the chest image is a reverse image, in which black and white are reversed, the head side has low pixel values, and the abdominal side has high pixel values). The vertebral-body direction calculation unit 30 may analyze the gradient of pixels of the chest image along the median line detected by the median line detection unit, and judge the vertical direction of the subject (chest image) with respect to the median line. After then, the vertebral-body direction calculation unit 30 may calculate the direction of the vertebral bodies by using the aforementioned methods or by using other methods that will be described later.

As described above, the vertebral-body direction calculation unit 30 can accurately calculate the median line based on the positional relationship between the median line and the vertebral-body region in the chest image. Further, the vertebral-body direction calculation unit 30 can calculate, as the direction of the vertebral body as illustrated in FIG. 3C, a vector that is parallel to the median line and is directed to the head side of the subject.

Besides the aforementioned methods, after the median line detection unit uses data on the width of the vertebral bodies, which is stored in an auxiliary storage apparatus, and performs processing on the vertebral-body region extracted by the vertebral-body region extraction unit 20 by fitting a rectangle that has a short side of an appropriate length (size) corresponding to the width of the vertebral bodies thereto, the vertebral-body direction calculation unit 30 may calculate, as the direction of the vertebral bodies, the direction of the long side of the rectangle when the area of pixels of the vertebral region within the rectangle is largest.

Alternatively, the vertebral-body direction calculation unit 30 may calculate the direction of the vertebral bodies by using a least square method. Specifically, the vertebral-body direction calculation unit 30 may calculate the direction of the vertebral bodies by fitting a straight line to the direction of the vertebral bodies in the vertebral-body region extracted by the vertebral-body region extraction unit 20. For example, the vertebral-body direction calculation unit 30 obtains coefficients a, b that can minimize the value of the following equation (7) with respect to pixel (x, y) in the vertebral-body region extracted by the vertebral-body region extraction unit 20:

$$\Sigma[(ax+b)-y]^2 \quad (7).$$

The obtained coefficients a, b are used so that equation (8) represents a straight line parallel to the vertebral bodies:

$$y=ax+b \quad (8).$$

Generally, in the vertebral-body region of the chest image, the pixel values on the upper side (head side) of the subject are high, and the pixel values on the lower side (abdominal side) thereof are low (when the chest image is a reverse image, in which black and white are reversed, the head side has low pixel values, and the abdominal side has high pixel values). Therefore, the vertebral-body direction calculation unit 30 can calculate the direction of the vertebral bodies by using the gradient of pixels of the chest image and a direction parallel to the vertebral-body region, which has been extracted by using the aforementioned method. For example, the vertebral-body direction calculation unit 30 can obtain, as the direction of the vertebral bodies as illustrated in FIG. 3C, a vector that is parallel to the vertebral-body region and directed to the head side of the subject.

The chest image rotation unit 40 rotates the chest image so that the calculated direction of the vertebral bodies becomes perpendicular to the horizontal direction of the chest image as illustrated in FIG. 3D (step #4). For example, the chest image rotation unit 40 may rotate the chest image by affine transformation so that the obtained direction of the vertebral bodies becomes perpendicular to the horizontal direction of the chest image.

The output unit 50 displays the chest image before rotation and/or the chest image after rotation on a monitor (display) or the like.

Further, the output unit 50 may perform trimming on the rotated chest image so that at least a lung-field region remains in the image after trimming, and output the chest image after trimming.

Further, trimming may be performed in such a manner that the horizontal side of the chest image after trimming and the horizontal side of the chest image before rotation are parallel to each other.

Further, an image processing apparatus (not illustrated) may be provided on the outside of the chest image rotation apparatus of the present invention and connected to the chest image rotation apparatus. Alternatively, the image processing apparatus may be installed in the chest image rotation apparatus of the present invention.

The image processing apparatus may detect an anatomical region (for example, a chest image or the like) of a subject in a frontal image of the chest, and perform gradation processing (gray scale processing) and frequency processing on the image based on image signals in the detected region.

Figure 9:
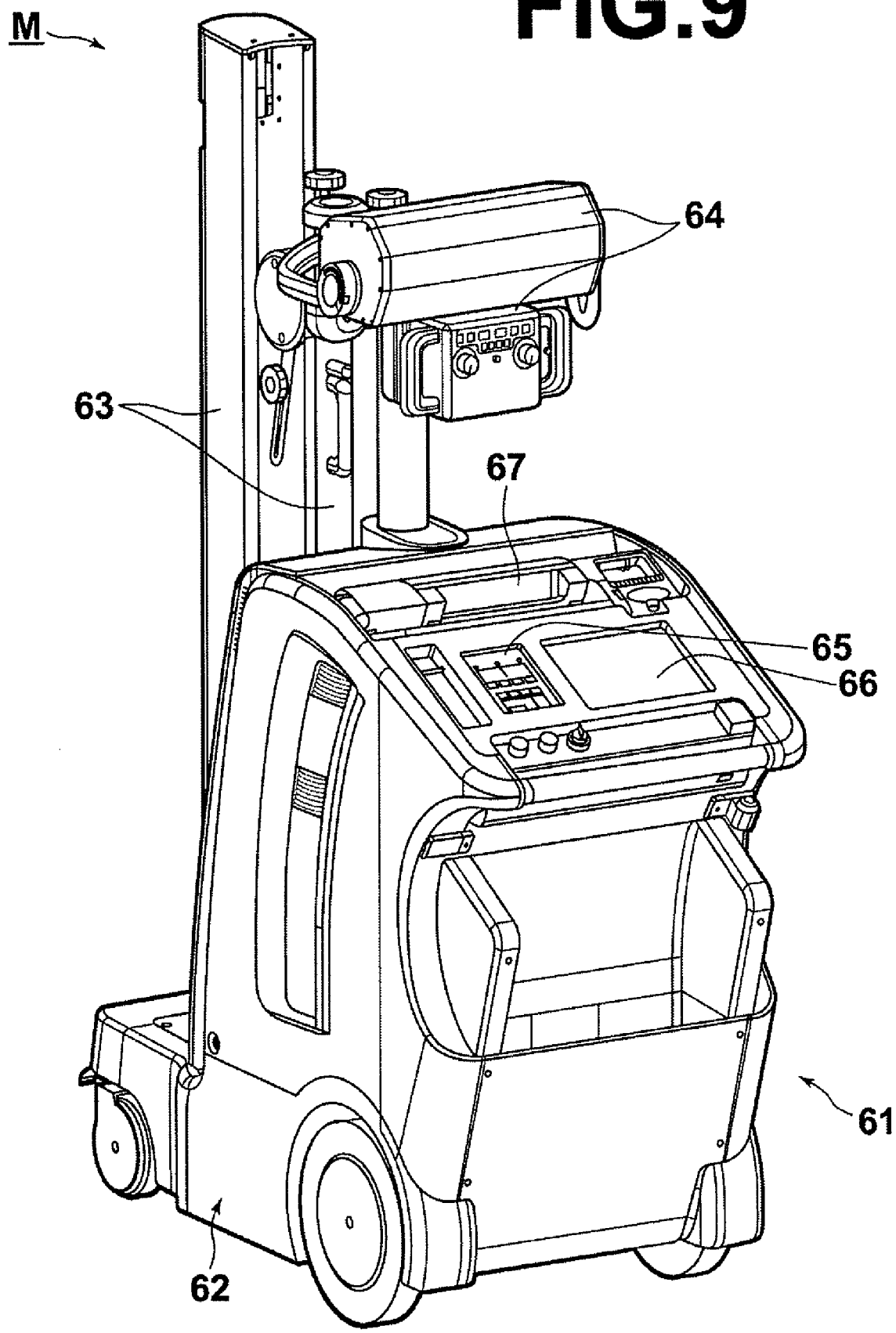
FIG. 9 is a diagram illustrating a mobile cart for doctor's visits to patients' rooms.
Figure 10:
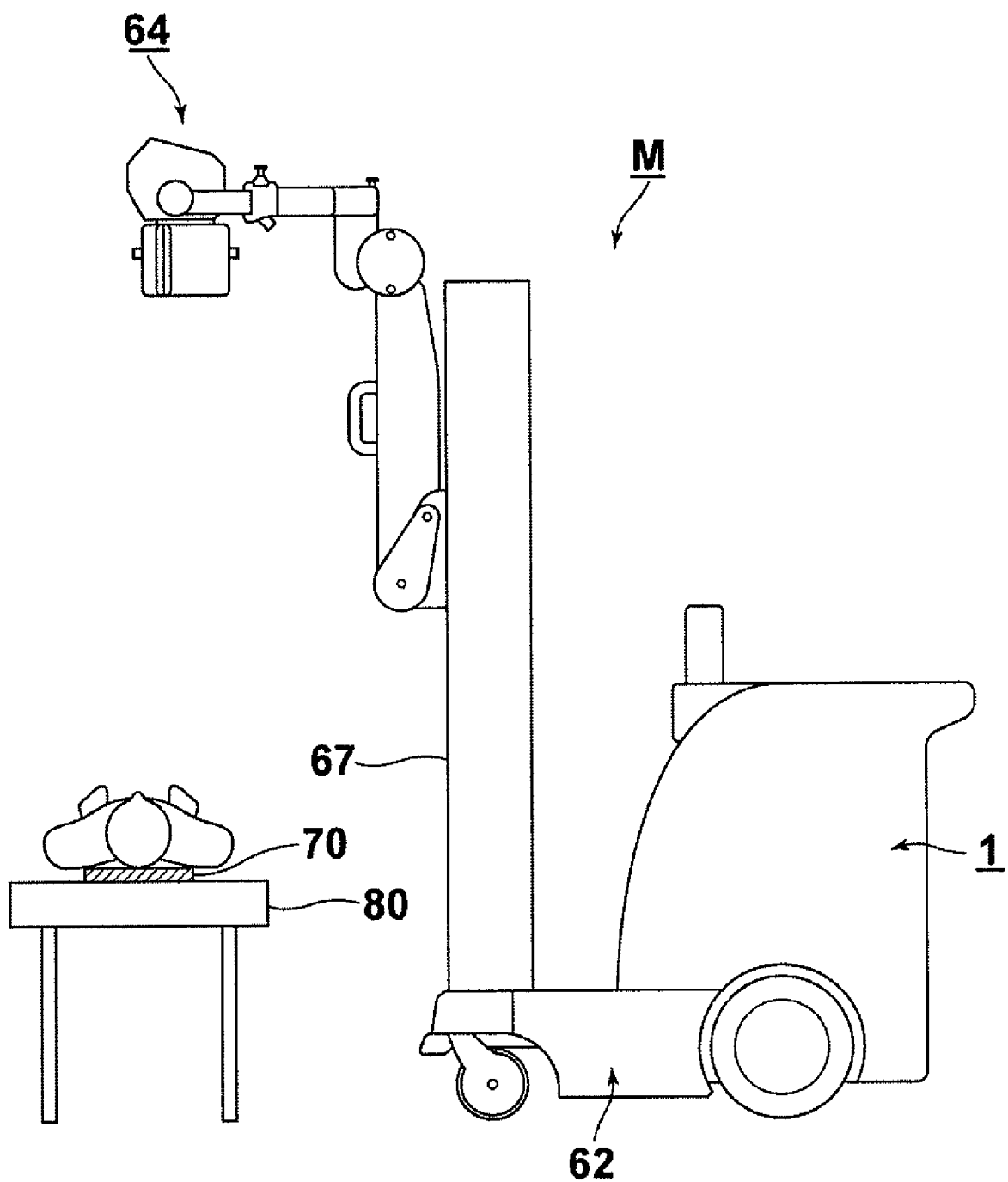
FIG. 10 is a conceptual diagram illustrating a case of imaging a subject by using the mobile cart.

In some cases, the chest image input unit 10 inputs a chest image obtained by using a mobile X-ray apparatus (hereinafter referred to as mobile cart M), as illustrated in FIG. 9. When the mobile cart M is used to obtain the image, a cassette is placed on the back side of a subject (patient) who is lying on a bed during imaging. Therefore, the direction of the axis (body axis) of the subject with respect to the sides of the cassette is not always stable (the same).

Therefore, the chest image rotation apparatus of the present invention and an image processing apparatus (not illustrated) may be installed in the mobile cart. Further, a cassette 70 may be inserted into a cassette insertion slot 67 to read out a chest image from the cassette 70. Further, a median line of the subject may be directly detected.

The mobile cart M includes a body unit 61, a mobile platform (base) 62, a support mechanism 63, an X-ray generation unit 64, an operation panel 65, a support pole for adjusting the position of the X-ray generation unit 64, a panel 66 (an example of a display device), the cassette insertion slot 67, and the like. The cassette insertion slot 67 is provided in the body unit 61 to insert the cassette into an image readout apparatus. Further, a touch panel is attached to the monitor 66. The monitor 66 may be used to perform setting on the X-ray generation unit 64 and the image readout apparatus. Further, the monitor 66 may be used to input patient's information or the like. Further, the monitor can display an input chest image by reading out the image from the cassette by using the image readout apparatus.

Further, the rotation angle and the input image may be correlated to each other and stored in a data recording medium or the like so that a user can change the rotation angle of the rotated chest image later. The user may manually correct (change) the rotation angle by using the touch panel of the monitor 66. Further, a corrected image that has been rotated at a corrected rotation angle may be output at the monitor 66.

Further, instead of operation using the touch panel, a table may be provided next to the mobile cart M, and a mouse connected to the mobile cart M may be set on the table. Further, arbitrary two points may be selected in the chest image displayed on the monitor 66 by using the mouse. Further, the direction of the vertebral bodies may be set based on the two points.

Further, the user may change the range of trimming, as described above, by using the touch panel or the mouse. In that case, the chest image rotation unit 40 may recalculate the rotation angle based on the set direction of the vertebral bodies and rotate the chest image. Further, the rotated chest image may be displayed on the monitor 66 again.

Further, the image processing apparatus may judge, based on the inclination of the median line or the calculated direction of the vertebral bodies, whether imaging has been performed in a correct direction. When the image processing apparatus judges that the direction is not correct and re-imaging of the subject is necessary, an alert may be displayed on the monitor 66 to inform the user that the subject should be imaged again (re-imaging).

When the chest image rotation apparatus of the present invention is installed in the mobile cart M, if a median line or the direction of the vertebral bodies of a chest image is inclined, it is possible to recognize such imaging conditions immediately after imaging. Therefore, it is possible to immediately prepare to re-image the subject.

Next, a second embodiment of the present invention will be described.

A chest image rotation apparatus according to the second embodiment of the present invention includes substantially similar elements to the elements of the chest image rotation apparatus according the aforementioned embodiment (first embodiment) of the present invention. Therefore, only elements that are essential to explanation of the second embodiment will be illustrated and described. As for elements that are similar to the elements of the first embodiment, the same reference numerals as those of the first embodiment will be assigned, and the detailed descriptions thereof will be omitted.

In the second embodiment, the chest image input unit 10 inputs a plurality of chest images. The vertebral-body region extraction unit 20 extracts a vertebral region from each of the plurality of chest images input by the chest image input unit 10. The vertebral-body direction calculation unit 30 calculates, based on the extracted vertebral regions, the direction of the vertebral bodies in each of the plurality of chest images, respectively. The chest image rotation unit 40 rotates at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image. The output unit 50 outputs the predetermined chest image and the at least one of the plurality of chest images that is not the predetermined chest image.

Figure 7:
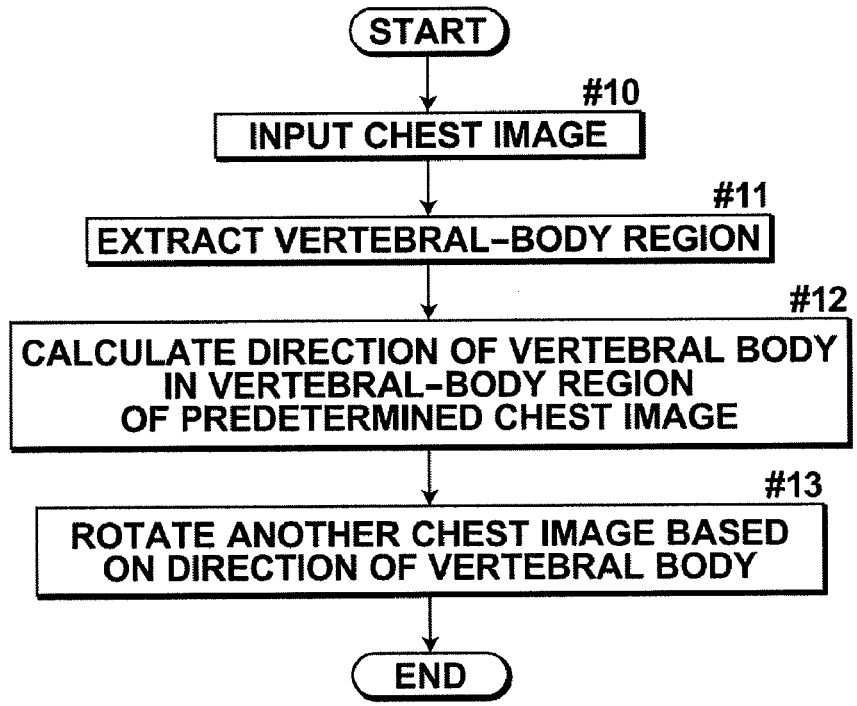
FIG. 7 is a flow chart showing a series of processes in a second embodiment of the present invention.

FIG. 7 is a flow chart showing a series of processes performed by the chest image rotation apparatus according to the second embodiment.

As illustrated in FIG. 7, first, the chest image input unit 10 inputs a plurality of chest image, as illustrated in FIG. 3A for example, which have been obtained by imaging the chest of a subject (step #10). Next, the vertebral-body region extraction unit 20 extracts the vertebral-body region as illustrated in FIG. 3B from each of the chest images in a manner similar to the first embodiment (step #11). The vertebral-body region extraction unit 20 performs the processing for extracting the vertebral-body region on each of the plurality of chest images. Next, the vertebral-body direction calculation unit 30 calculates, based on the vertebral-body region extracted by the vertebral-body region extraction unit 20, the direction of the vertebral bodies in the chest image (step #12). The vertebral-body direction calculation unit 30 performs the processing for calculating the direction of the vertebral bodies in each of the plurality of chest images.

The chest image rotation unit 40 rotates at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image (step #13).

Figure 8A:
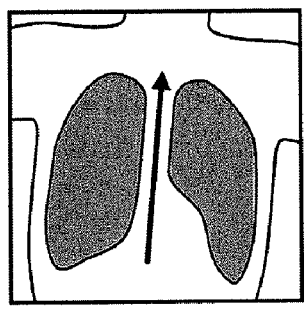
FIG. 8A is a conceptual diagram illustrating a process in the second embodiment of the present invention.

This processing will be described more specifically. Chest image 1 illustrated in FIG. 8A corresponds to the predetermined chest image in step #13, and chest image 2 illustrated in FIG. 8B and/or chest image 3 illustrated in FIG. 8C corresponds to the at least one of the plurality of chest images that is not the predetermined chest image in step #13.

Figure 8B:
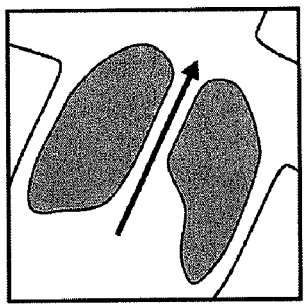
FIG. 8B is a conceptual diagram illustrating a process in the second embodiment of the present invention.
Figure 8B:
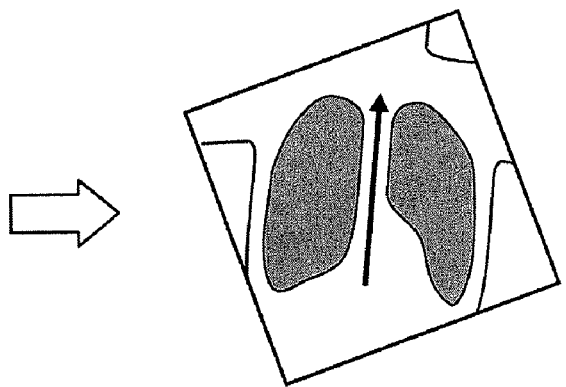
Figure 8C:
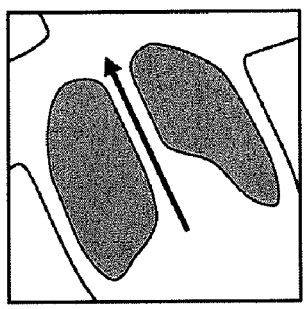
FIG. 8C is a conceptual diagram illustrating a process in the second embodiment of the present invention.
Figure 8C:
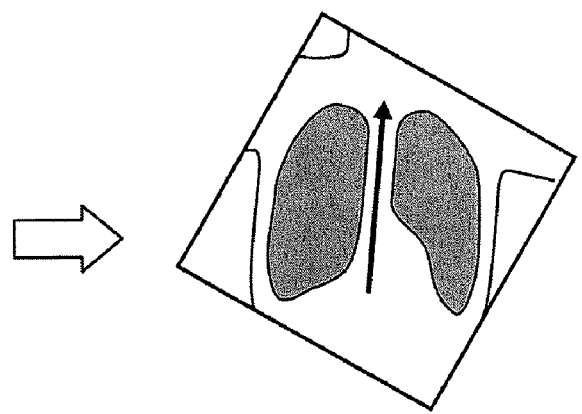

When the user (doctor) uses a plurality of images to observe the progress or course of a disease of a patient, a predetermined chest image (chest image 1 illustrated in FIG. 8A) is used as a base image, and the other image or images are rotated based on the base image. The other image or images are rotated so that the direction of the vertebral bodies in the other image or images become the same as the direction of the vertebral bodies in the predetermined chest image (chest image 1 illustrated in FIG. 8A) that has been calculated. For example, the direction of the vertebral bodies in the other image or images become the same as the direction of the vertebral bodies in the predetermined chest image, as illustrated in FIGS. 8B' and 8C'.

The output unit 50 may display the chest image before rotation and/or a rotated chest image or images next to each other on a monitor or the like.

When these images are displayed on the monitor or the like, the predetermined chest image and the other chest image or images may be displayed at the same magnification ratio or in the same size so that the user can easily compare the chest images with each other.

Further, the output unit 50 may trim the chest image before rotation or the chest image after rotation so that at least lung fields remain in the chest image after trimming, and output the trimmed chest image.

Further, trimming may be performed in such a manner that the horizontal side of the chest image after trimming becomes parallel to the horizontal side of the chest image before rotation.

Further, the elements that were described in the first embodiment may be used in the second embodiment.

What is claimed is:

1. A chest image rotation apparatus comprising:
   a chest image input unit that is used to input a chest image;
   a vertebral-body region extraction unit that extracts a vertebral-body region from the input chest image;
   a vertebral-body direction calculation unit that calculates, based on the extracted vertebral-body region, the direction of vertebral bodies in the chest image;
   a chest image rotation unit that rotates the chest image so that the calculated direction of the vertebral bodies becomes perpendicular to the horizontal side of the chest image; and
   an output unit that outputs the rotated chest image.

2. A chest image rotation apparatus, as defined in claim 1, wherein the output unit trims the rotated chest image so that at least lung fields remain in the chest image after trimming, and outputs the trimmed chest image.

3. A chest image rotation apparatus, as defined in claim 1 or 2, wherein the vertebral-body region extraction unit includes an edge component extraction unit, a vertebral-body direction estimation unit and a vertebral-body region determination unit, and wherein the edge component extraction unit extracts an edge component value that includes an edge direction value and an edge intensity value, the edge component value corresponding to the width of the vertebral bodies, from the chest image, and wherein the vertebral-body direction estimation unit estimates the direction of the vertebral bodies based on the magnitude of the extracted edge component value, and wherein the vertebral-body region determination unit scans the chest image substantially perpendicular to the estimated direction of the vertebral bodies to obtain the values of pixels in the chest image, and extracts the vertebral-body region by comparing the obtained values of the pixels with a predetermined threshold value, and wherein the vertebral-body direction calculation unit detects a median line in the extracted vertebral-body region, and calculates the direction of the vertebral bodies based on the median line.

4. A chest image rotation apparatus comprising:
   a chest image input unit that is used to input a plurality of chest images;
   a vertebral-body region extraction unit that extracts a vertebral-body region from each of the plurality of chest images;
   a vertebral-body direction calculation unit that calculates, based on the extracted vertebral-body region, the direction of vertebral bodies in each of the plurality of chest images;
   a chest image rotation unit that rotates at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image; and an output unit that outputs the predetermined chest image and the at least one of the plurality of chest images that is not the predetermined chest image and that has been rotated.

5. A chest image rotation apparatus, as defined in claim 4, wherein the vertebral-body region extraction unit includes an edge component extraction unit, a vertebral-body direction estimation unit and a vertebral-body region determination unit, and wherein the edge component extraction unit extracts an edge component value that includes an edge direction value and an edge intensity value, the edge component value corresponding to the width of the vertebral bodies, from the chest image, and wherein the vertebral-body direction estimation unit estimates the direction of the vertebral bodies based on the magnitude of the extracted edge component value, and wherein the vertebral-body region determination unit scans the chest image substantially perpendicular to the estimated direction of the vertebral bodies to obtain the values of pixels in the chest image, and extracts the vertebral-body region by comparing the obtained values of the pixels with a predetermined threshold value, and wherein the vertebral-body direction calculation unit detects a median line in the extracted vertebral-body region, and calculates the direction of the vertebral bodies based on the median line.

6. A chest image rotation method comprising the steps of:
receiving a chest image;
extracting a vertebral-body region from the received chest image;
calculating, based on the extracted vertebral-body region, the direction of vertebral bodies in the chest image;
rotating the chest image so that the calculated direction of the vertebral bodies becomes perpendicular to the horizontal side of the chest image; and
outputting the rotated chest image.

7. A chest image rotation method comprising the steps of:
receiving a plurality of chest images;
extracting a vertebral-body region from each of the plurality of chest images;
calculating, based on the extracted vertebral-body region, the direction of vertebral bodies in each of the plurality of chest images;
rotating at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image; and
outputting the predetermined chest image and the at least one of the plurality of chest images that is not the predetermined chest image and that has been rotated.

8. A computer-readable recording medium stored therein a program for causing a computer to execute the procedures of:
receiving a chest image;
extracting a vertebral-body region from the received chest image;
calculating, based on the extracted vertebral-body region, the direction of vertebral bodies in the chest image;
rotating the chest image so that the calculated direction of the vertebral bodies becomes perpendicular to the horizontal side of the chest image; and
outputting the rotated chest image.

9. A computer-readable recording medium stored therein a program for causing a computer to execute the procedures of:
receiving a plurality of chest images;
extracting a vertebral-body region from each of the plurality of chest images;
calculating, based on the extracted vertebral-body region, the direction of vertebral bodies in each of the plurality of chest images;
rotating at least one of the plurality of chest images that is not a predetermined chest image thereof so that the calculated direction of the vertebral bodies in the at least one of the plurality of chest images that is not the predetermined chest image becomes the same as the calculated direction of the vertebral bodies in the predetermined chest image; and
outputting the predetermined chest image and the at least one of the plurality of chest images that is not the predetermined chest image and that has been rotated.

* * * * *